US007007791B2

(12) United States Patent
Stingel, III et al.

(10) Patent No.: US 7,007,791 B2
(45) Date of Patent: Mar. 7, 2006

(54) CONTAINER STORAGE AND DELIVERY SYSTEM

(76) Inventors: Frederick J. Stingel, III, 614 Holt La., Asheville, NC (US) 28803; Jeffrey W. Stingel, 1408 Kenton La., Asheville, NC (US) 28803

( * ) Notice: Subject to any disclaimer, the term of this patent is extended or adjusted under 35 U.S.C. 154(b) by 318 days.

(21) Appl. No.: 10/389,513

(22) Filed: Mar. 14, 2003

(65) Prior Publication Data
US 2004/0191031 A1 Sep. 30, 2004

(51) Int. Cl.
*B65G 47/46* (2006.01)
(52) U.S. Cl. ............... 198/368; 198/370.07; 198/468.8
(58) Field of Classification Search ................ 198/368, 198/370.03, 468.8
See application file for complete search history.

(56) References Cited

U.S. PATENT DOCUMENTS

| 245,312 A | * | 8/1881 | Nichols ....................... 414/564 |
| 2,732,057 A | * | 1/1956 | Temple ....................... 198/358 |
| 3,108,679 A | * | 10/1963 | Woody ....................... 198/468.6 |
| 3,262,584 A | | 7/1966 | Hayford, Jr. et al. |
| 3,835,978 A | * | 9/1974 | Hartzell et al. ............ 198/463.4 |
| 4,621,745 A | | 11/1986 | Grace |
| 5,636,966 A | | 6/1997 | Lyon et al. |
| 5,733,098 A | | 3/1998 | Lyon et al. |
| 5,903,464 A | | 5/1999 | Stingel, Jr. et al. |
| 5,934,864 A | | 8/1999 | Lyon et al. |
| 5,996,316 A | | 12/1999 | Kirschner |

OTHER PUBLICATIONS

Layer Picking, Universal layer picker for mixed pallets brochure, Univeyor, Leicester, U.K.
SI ITEMatic Systems brochure, SI Handling Systems, Inc., Easton, Pennsylvania.

* cited by examiner

*Primary Examiner*—Thomas J. Brahan
(74) *Attorney, Agent, or Firm*—Akerman Senterfitt

(57) ABSTRACT

A container directing apparatus for directing containers carried by a conveyor, includes a lifting device for lifting the containers off of the conveyor. A moving apparatus moves the container off of the lifting device. The lifting device can include a lifting surface which can be inclined upward in the direction of container travel, such that containers move up onto the lifting surface. The lifting surface can then be leveled prior to moving the containers off of the lifting device. A container storage and delivery system and a method for storing and delivering containers are also disclosed.

8 Claims, 15 Drawing Sheets

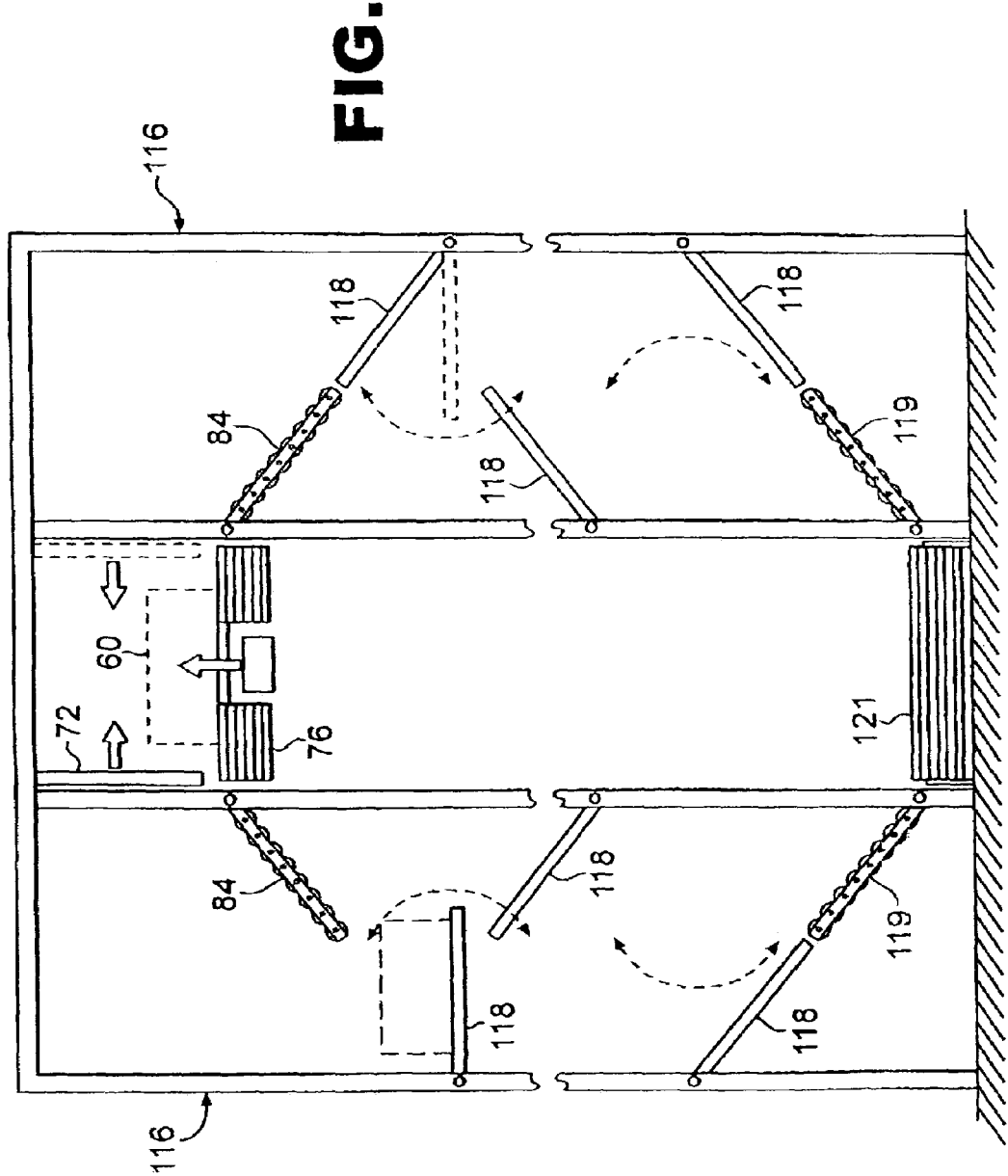

CONTAINER STORAGE AND DELIVERY SYSTEM

STATEMENT REGARDING FEDERALLY SPONSORED RESEARCH OR DEVELOPMENT

Not applicable.

FIELD OF THE INVENTION

This invention relates generally to container storage and delivery systems.

BACKGROUND OF THE INVENTION

Container storage and delivery systems typically include a supply conveyor for conveying the containers to one or more storage stations or devices. It is necessary that the containers be directed from the conveyor to the appropriate storage station. Numerous devices have been constructed for directing containers from conveyors into storage devices.

Many different container storage devices and stations are known. Grace, U.S. Pat. No. 4,621,745, discloses an individual container storage and delivery system in which a vertically accumulating storage and retrieval system for containers is loaded at the top of a tower and selectively dispenses at the bottom. The tower has a frame that defines first and second tower sections, each supporting a number of vertically spaced shelf trays which in turn support the containers which are stacked on the trays when loaded. The shelf trays of each tower section face inwardly toward and are staggered relative to each other. Each tray is mounted for pivotal movement about a horizontal axis and is operated so that when a container is dispensed from a bottom shelf tray, each higher tray beginning at the bottom and progressing upward one at a time, pivots to transfer its carton to the upwardly tilted, next lower, empty shelf tray. This process is repeated until each container has been transferred to the next lower shelf tray. As a container is loaded at the top of the tower, the shelf trays are operated to pass the container downwardly in a zig-zag fashion from one tray to another until it reaches the highest unloaded shelf tray.

A common conveyor is a chain-type conveyor which comprises a single chain covered by a plurality of top plates that are secured to the chain. Containers are moved by placing the container onto the top plates of this conveyor system. Traditional chain conveyors are not suitable for some of the uses of belt conveyors.

SUMMARY OF THE INVENTION

A container directing apparatus for directing containers carried by a conveyor includes a lifting device for lifting the containers off of the conveyor. A moving apparatus moves the containers off of the lifting device. The containers can be directed to one or more storage stations.

The conveyor moves the containers in a direction of travel and the lifting device includes a lifting surface. The lifting device inclines the lifting surface upward in the direction of container travel such that containers being moved by the conveyor are lifted upward onto the lifting surface. The lifting device, after a container has been moved onto the inclined lifting surface, substantially levels the lifting surface. The moving apparatus then moves the container off of the lifting surface, where it can be directed into a suitable structure such as a storage station. The lifting device can include a stop for stopping the movement of the container on the lifting surface. The stop can be operatively connected to the lifting surface, whereby lifting of the stop will incline the lifting surface.

The lifting device can comprise any suitable structure for inclining and leveling the lifting surface. This structure can comprise one or more solenoids. Control apparatus can be provided to control the operation of the lifting device and the pushing apparatus. The control apparatus can be a computer system which tracks and directs containers through the container storage and delivery system. The conveyor can comprise first and second substantially parallel conveyor tracks, and the lifting surface can be provided between the tracks. The conveyor can be a chain conveyor.

The moving apparatus can comprise a push member such as a push plate and structure for moving the push plate. The structure for moving the push plate can be any suitable structure such as one or more solenoids, or pneumatic operating structure. The push plate is moved over the lifting device, such that the push plate will contact the container and direct it off of the lifting surface.

A container storage and delivery system includes a conveyor for conveying containers. At least one container storage station is provided. A container directing apparatus includes a lifting device for lifting the containers off of the conveyor. The lifting device can include a lifting surface and can incline the lifting surface upward in the direction of travel of the container on the conveyor. The lifting device, after inclining, can substantially level the lifting surface. A stop can be provided to stop the movement of containers on the lifting surface. A moving apparatus moves the containers off of the lifting device.

A method of conveying articles includes the step of conveying containers on a conveyor. A lifting device lifts the containers off of the conveyor. A moving apparatus moves the containers off of the lifting device and into suitable structure such as a storage station. The storage station can be a vertically accumulating storage and delivery apparatus.

The method can include the step of providing a lifting surface on the lifting device, and inclining the lifting surface upward in the direction of travel of the container, such that containers traveling on the conveyor will be carried upward on the lifting surface. A stop can be used for stopping the movement of containers on the lifting surface.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 15 is a side elevation of an alternative embodiment of the subject invention.

DETAILED DESCRIPTION OF THE PREFERRED EMBODIMENTS

Figure 1:
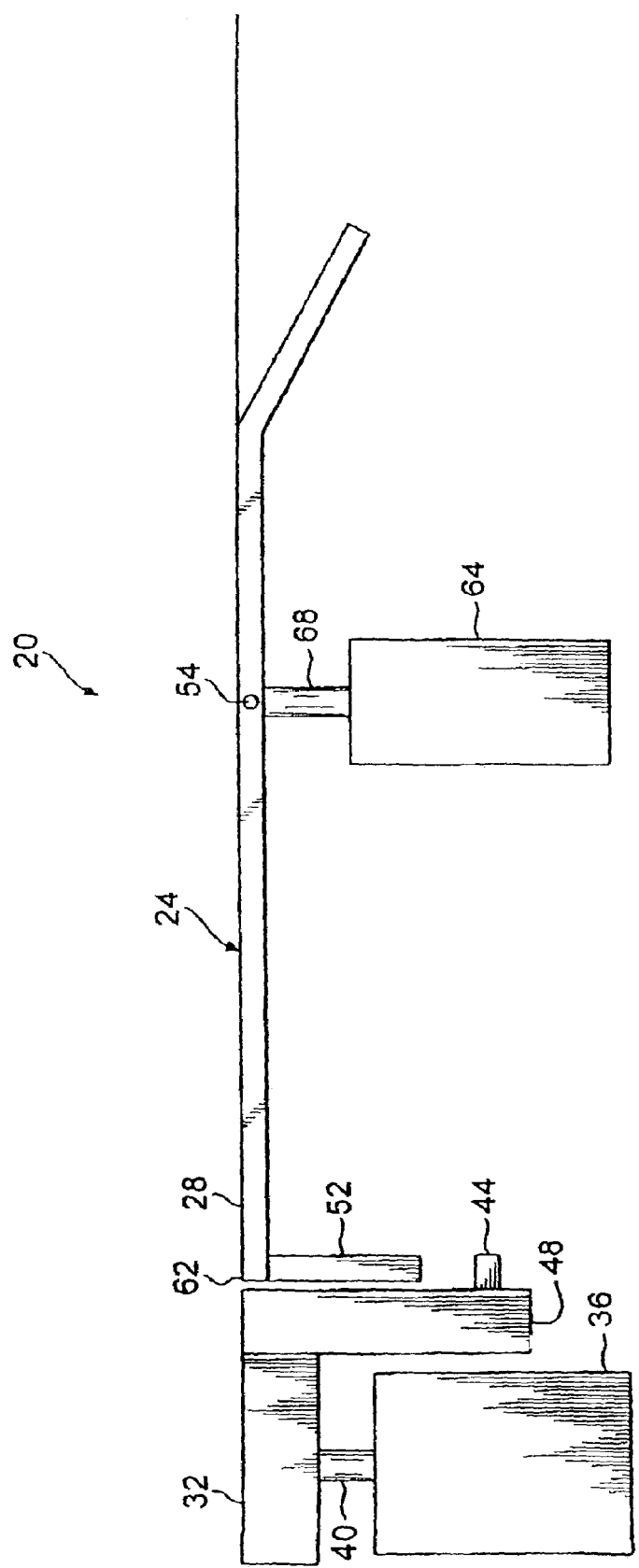
FIG. 1 is a side elevation view of a container directing apparatus according to the invention, in a first mode of operation.
Figure 2:
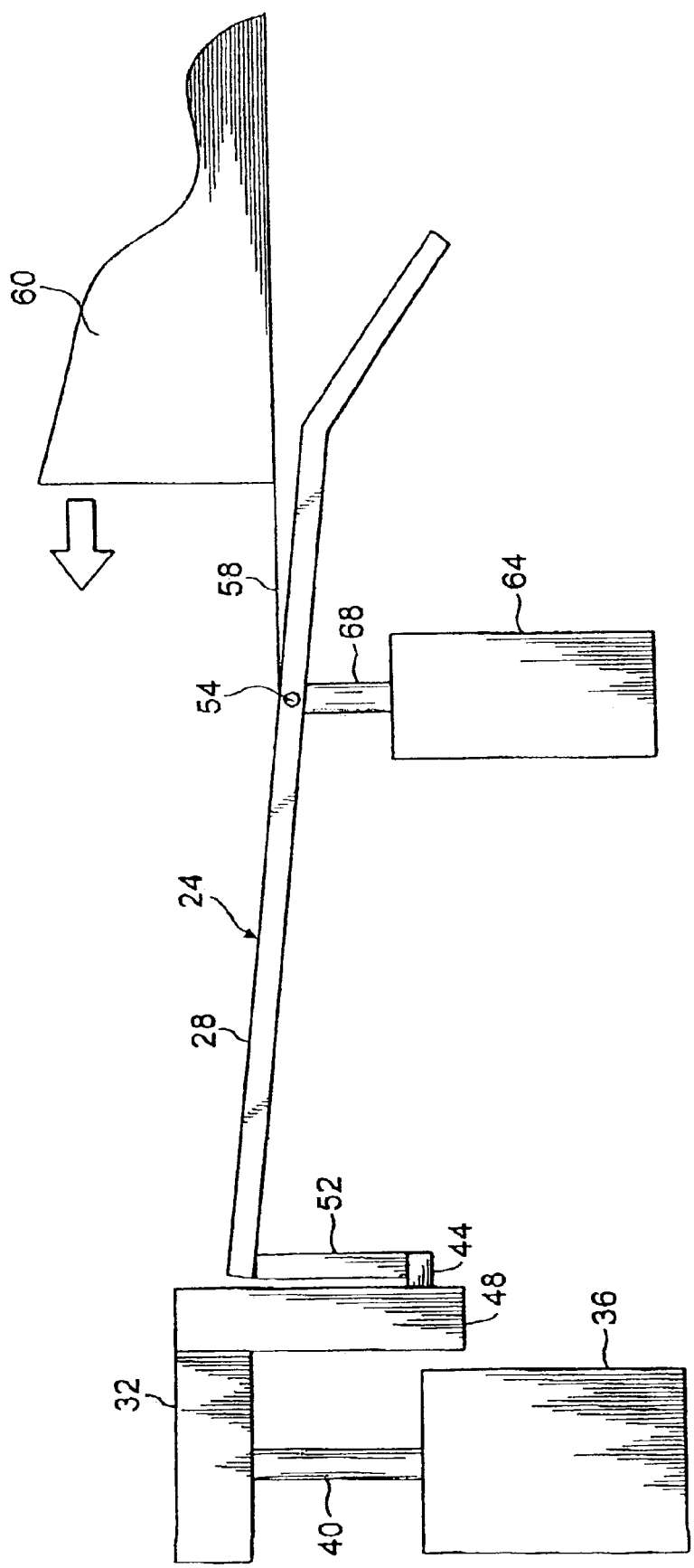
FIG. 2 is a side elevation view of a container directing apparatus according to the invention, in a second mode of operation.

There is shown in FIG. 1 a container directing apparatus 20 according to the invention. The container directing apparatus 20 includes a lifting device 24 with a lifting surface 28. A stop 32 can be provided for stopping the movement of containers. The lifting surface 28 and stop 32 are shown in the lowered position in FIG. 1. Suitable structure is provided for lifting the stop 32 upon demand. The structure can be a solenoid 36 as shown. Operation of the solenoid 36 raises shaft 40 to raise stop 32 (FIG. 2).

Figure 3:
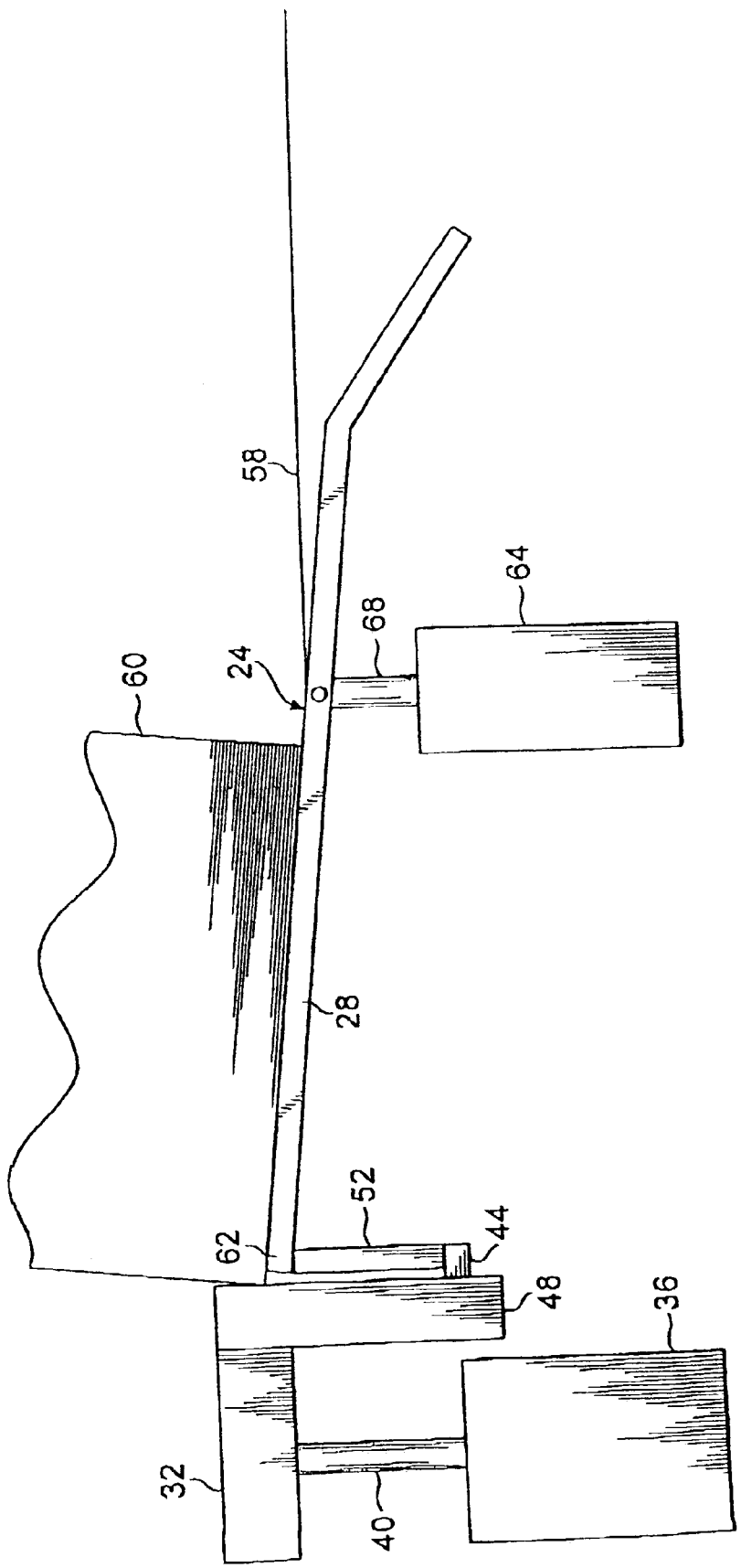
FIG. 3 is a side elevation view of a container directing apparatus according to the invention, in a third mode of operation.

Structure is also provided for inclining the lifting surface 28 in the direction of container travel. This structure can be any suitable structure. In the embodiment shown, a projection 44 is provided on a depending flange 48 of the stop 32, such that the projection 44 is raised with the stop 32. As it is raised, the projection 44 contacts depending flange 52 connected to lifting surface 28 such that raising of the stop 32 will cause the inclining of the lifting surface 28 as shown in FIG. 2. The lifting surface 28 is pivotally mounted at pivot point 54 to permit such pivotal inclining. Other constructions are possible to permit such movement. A container 60 moving along conveyor surface 58 will contact the inclined lifting surface FIG. 3) and will move up the inclined lifting surface 28. The presence of the stop 32 will prevent the container 60 from moving over the forward edge 62 of the lifting surface 28.

Figure 4:
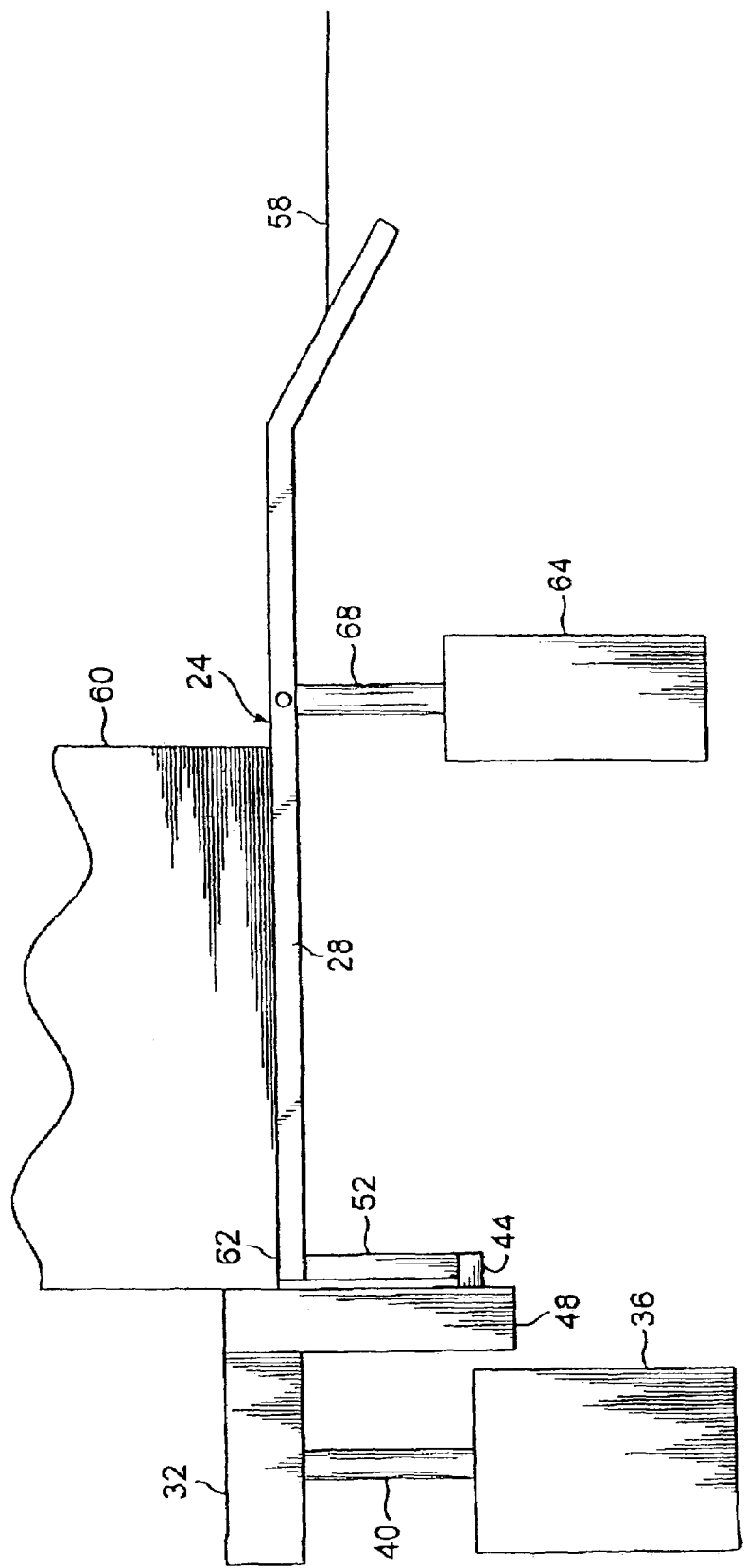
FIG. 4 is a side elevation view of a container directing apparatus according to the invention, in a fourth mode of operation.

The lifting surface 28 is then preferably substantially leveled. It is not necessary that the lifting surface 28 be perfectly level, however, it is preferable for efficient transfer of the container off of the lifting surface 28. The structure used to level the lifting surface 28 can be any suitable structure. In the embodiment shown, a solenoid 64 is operated to manipulate a shaft 68 which is connected to the lifting surface 28 to lift a rearward portion of the lifting surface 28 to a level commensurate with the height of the forward edge 62 of the lifting surface 28, as shown in FIG. 4. The container is then ready to be pushed off of the lifting surface 28.

The solenoid 36 and solenoid 64 can be of any suitable design. Lifting structures other than an electric solenoid, such as pneumatic and hydraulic lifting apparatus, can also be used.

Figure 5:
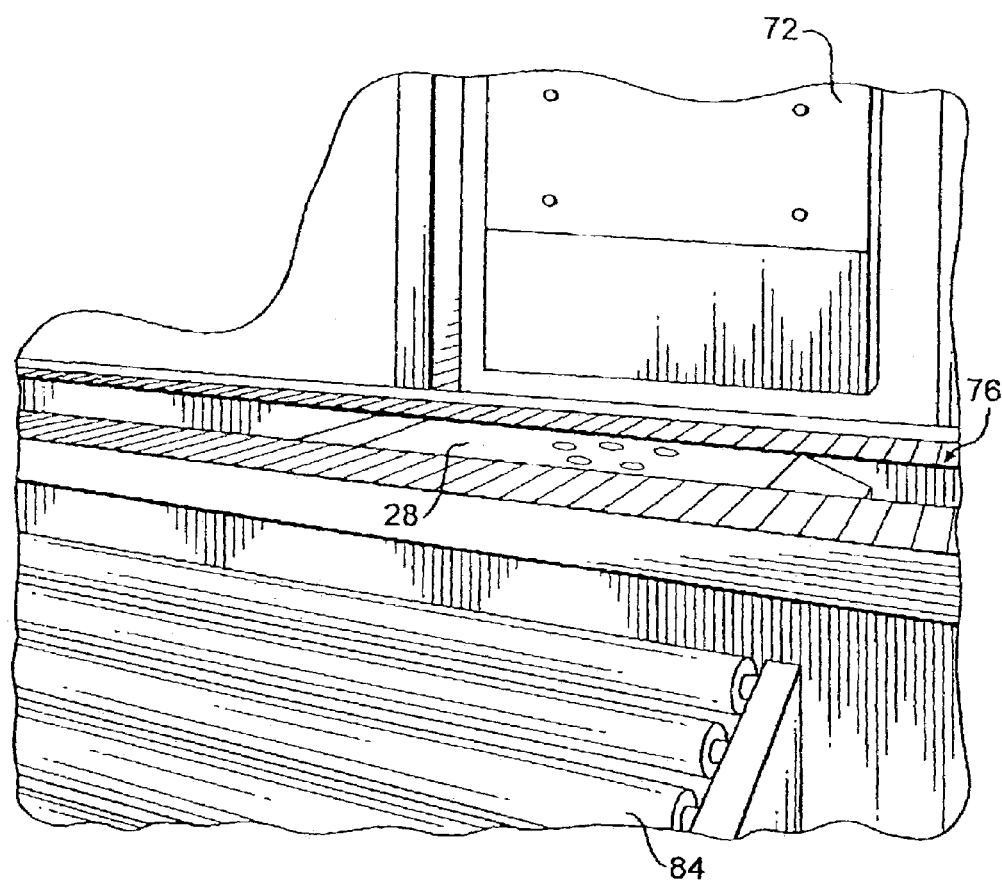
FIG. 5 is a perspective view of a container storage and delivery system according to the invention, in a first mode of operation.

There is shown in FIG. 5 a moving apparatus according to the invention. The moving apparatus can be any suitable structure adapted to move the container 60 off of the lifting surface 28. In the embodiment shown, the moving apparatus has a push plate 72 that is moved across the lifting surface 28 to move the container off of conveyor 76. Alternatively, the moving apparatus could be designed to pull the container off of the lifting surface 28 and conveyor 76.

Figure 6:
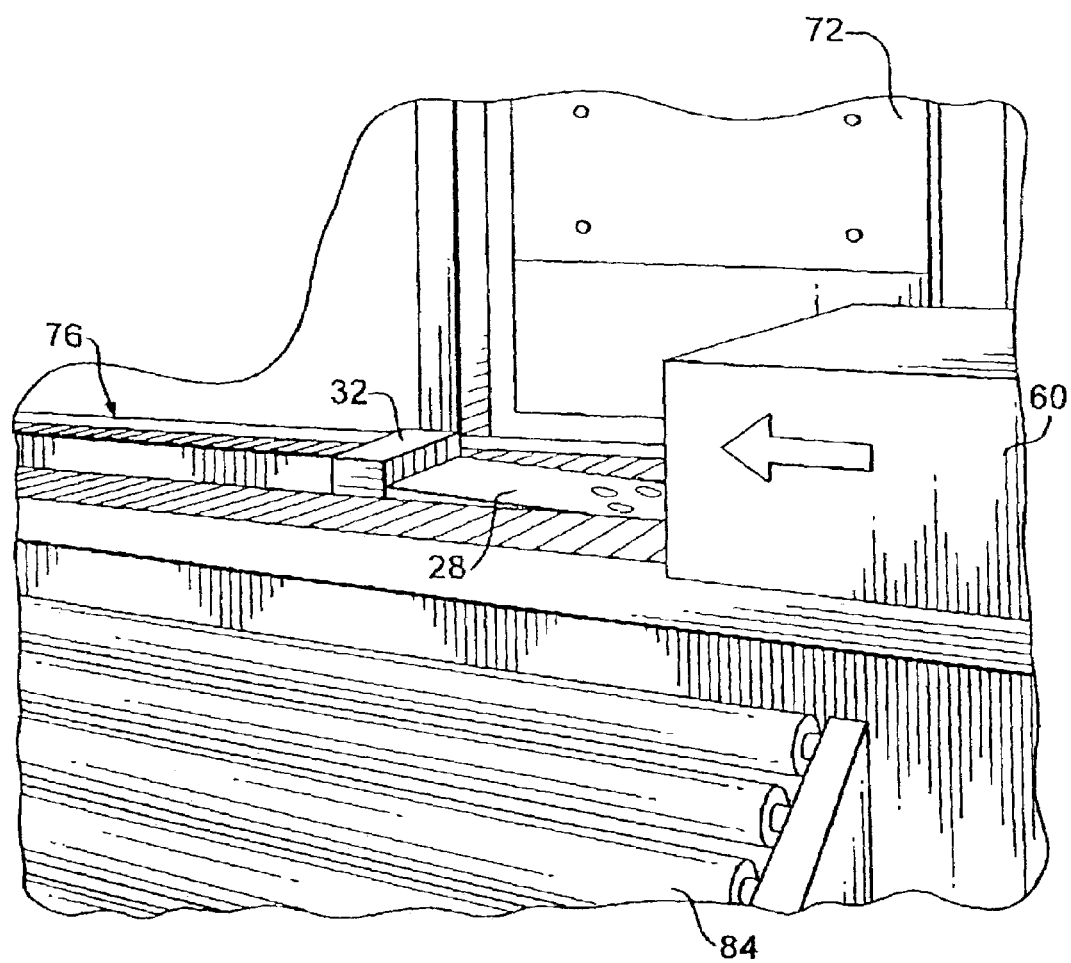
FIG. 6 is a perspective view of a container storage and delivery system according to the invention, in a second mode of operation.
Figure 7:
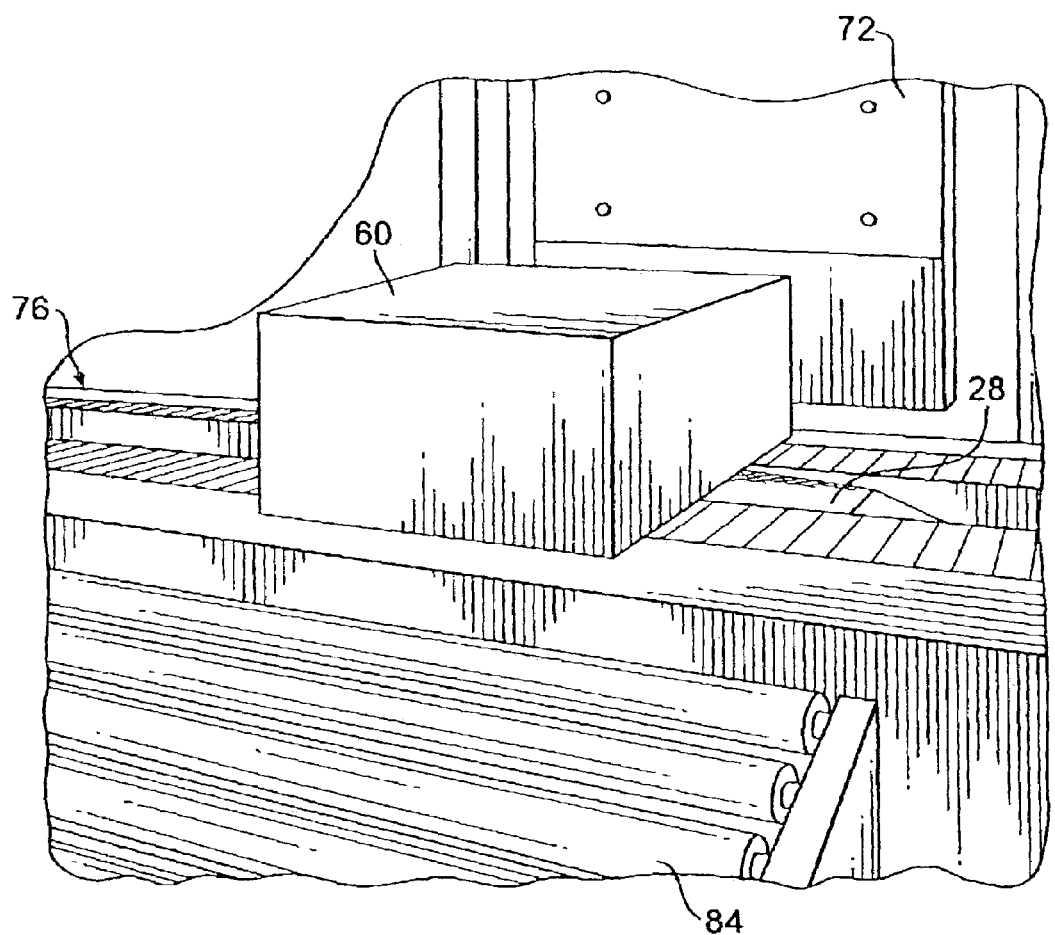
FIG. 7 is a perspective view of a container storage and delivery system according to the invention, in a third mode of operation.
Figure 8:
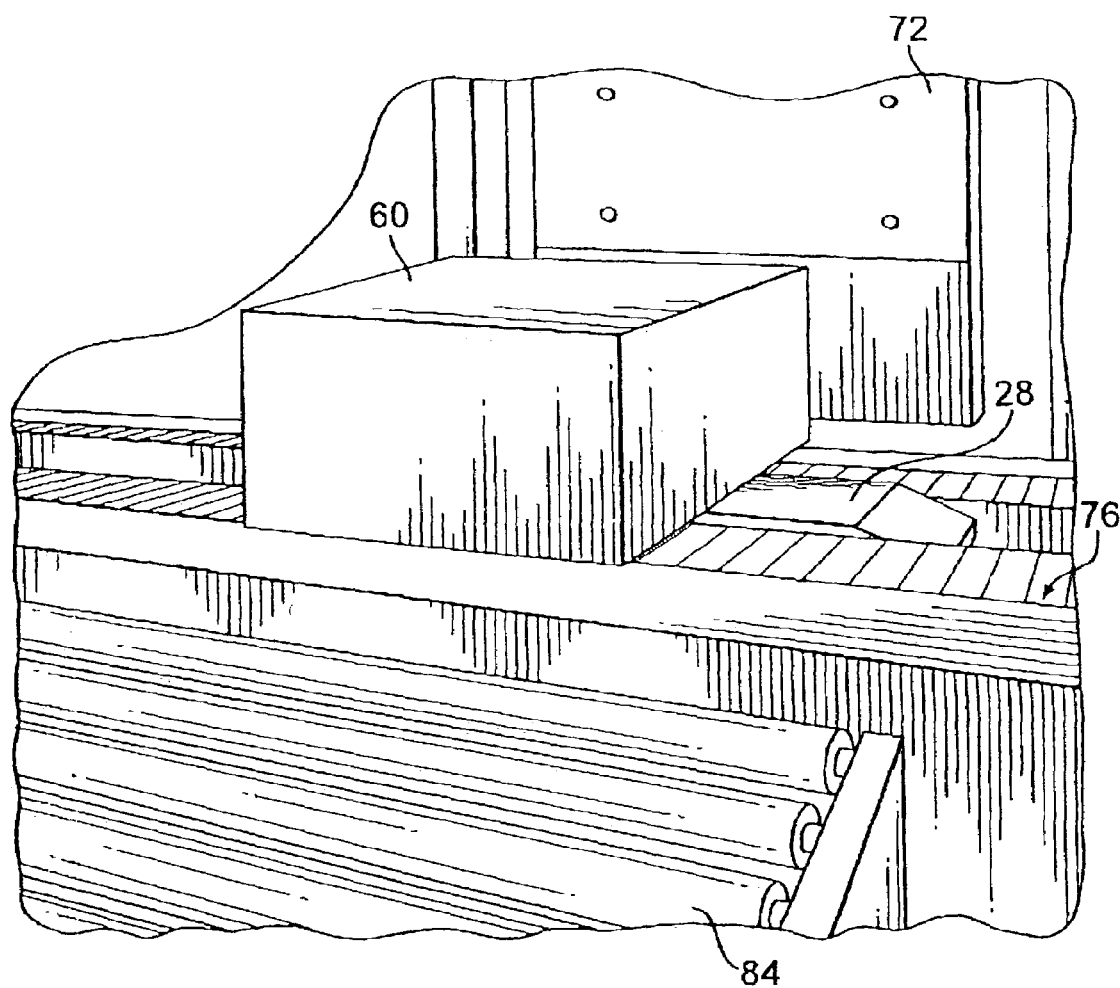
FIG. 8 is a perspective view of a container storage and delivery system according to the invention, in a fourth mode of operation.

As shown in FIG. 6, the container 60 is carried by movement of the conveyor 76. The container contacts the inclined lifting surface 28 and travels up the inclined surface through the driving force of the conveyor 76 and the container's own momentum. The pushing apparatus 72 is in a position lateral to the conveyor 76, lifting surface 28, and container 60 so as to not interfere with movement of the container 60. The container 60 travels up the inclined lifting surface 28 to the point that it contacts stop 32, whereupon its forward movement is halted, as shown in FIG. 7. Lifting surface 28 is then substantially leveled, as by operation of the solenoid 64, to the position shown in FIG. 8.

Figure 9:
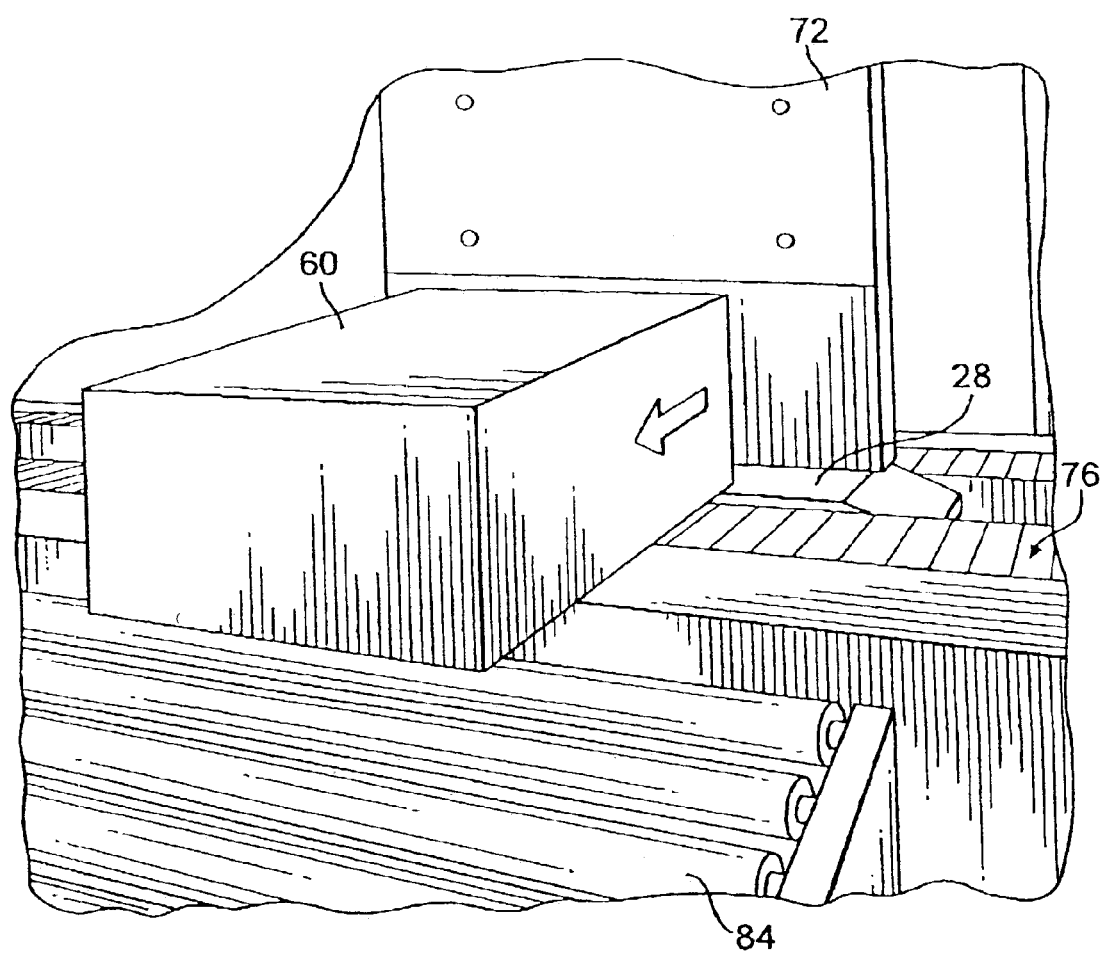
FIG. 9 is a perspective view of a container storage and delivery system according to the invention, in a fifth mode of operation.
Figure 10:
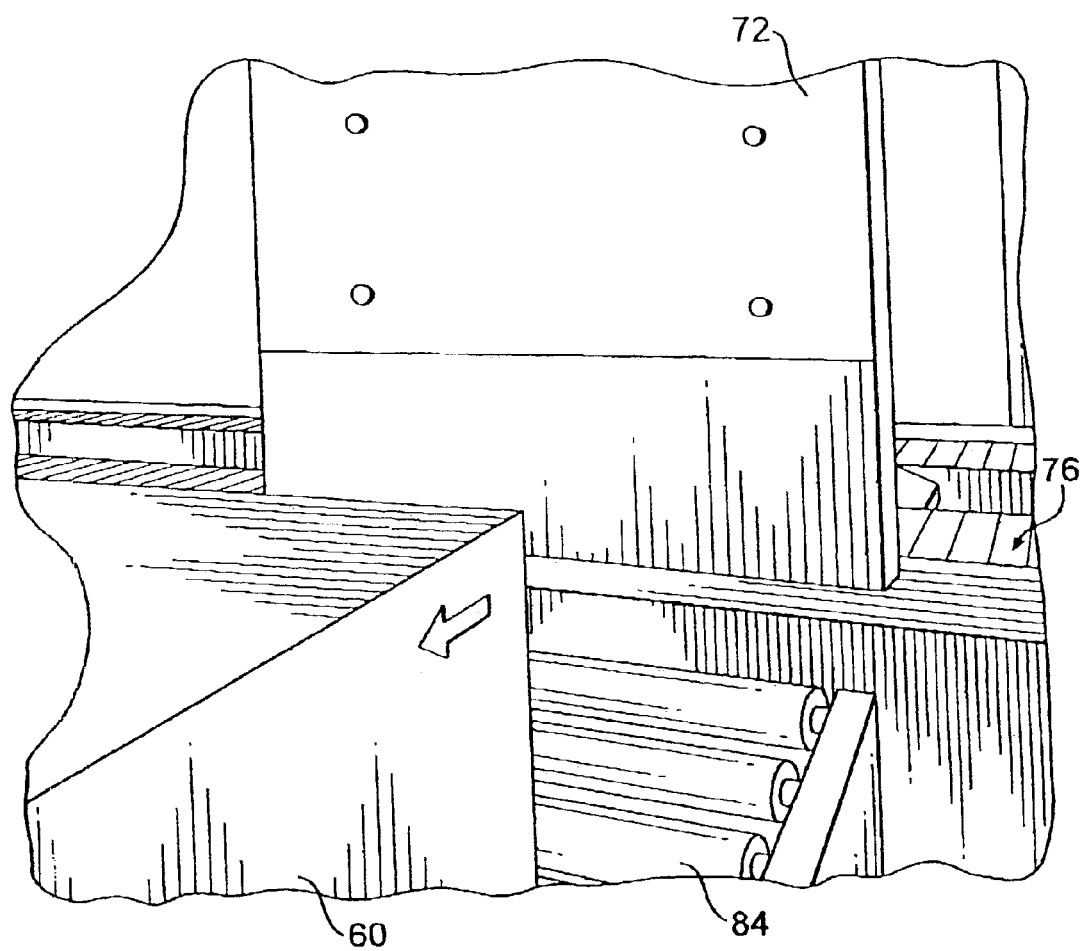
FIG. 10 is a perspective view of a container storage and delivery system according to the invention, in a sixth mode of operation.

The moving apparatus is then operated to move the push plate 72 across the lifting surface 28 to contact the container 60 and direct the container laterally onto conveyor 84 (FIG. 9). The push plate 72 is then on an opposite side of the conveyor 76 from the position where it began (FIG. 10). The push plate 72 can be retained in this position so as to move another container off of the lifting device 28 opposite direction, such as to a storage position that is on the side of the conveyor 76 that is opposite to the conveyor 84. Alternatively, the push plate 72 can be retracted to the original position shown in FIG. 5 to repeat the process.

Figure 11:
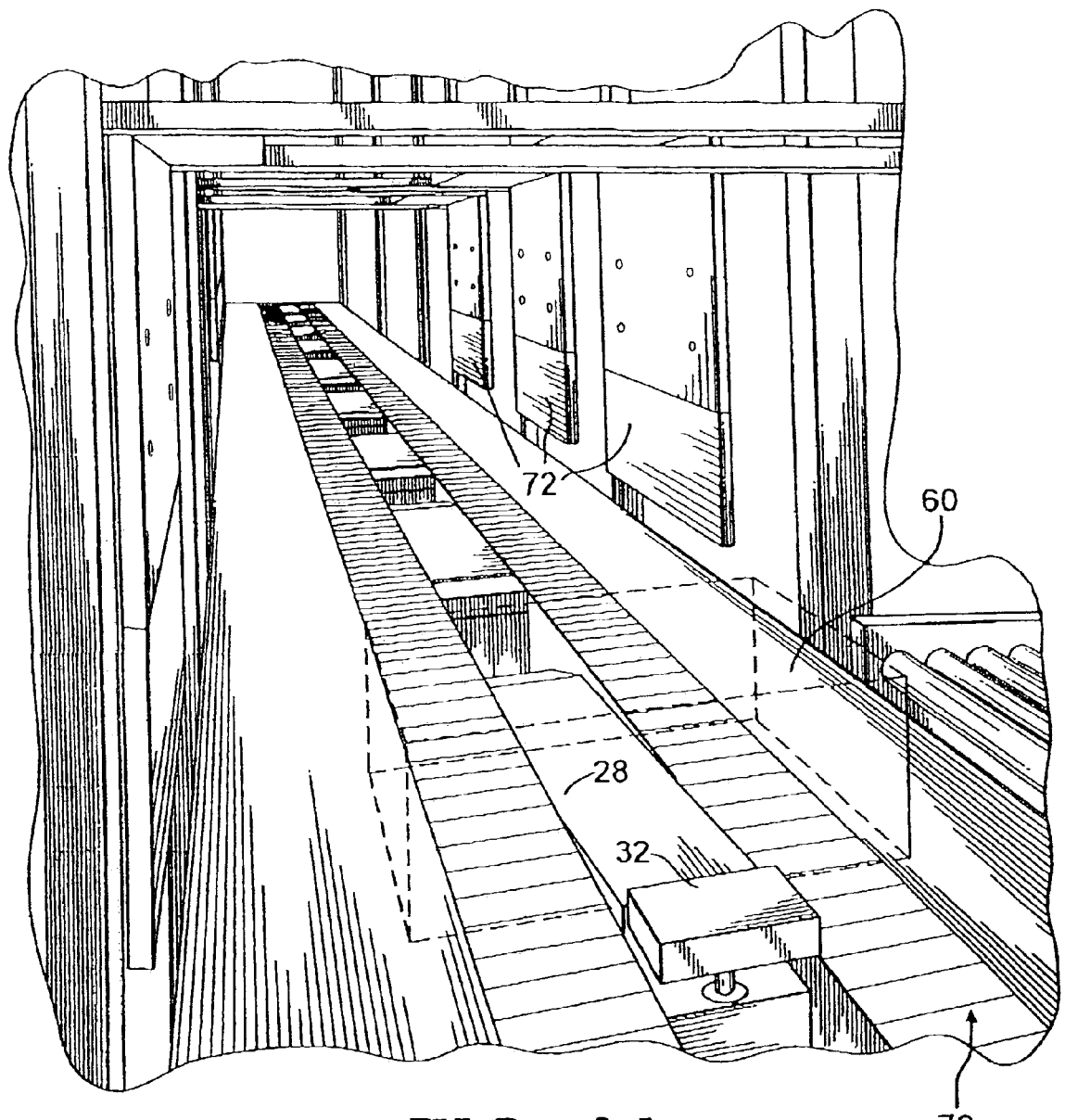
FIG. 11 is a perspective view of a plurality of container storage and delivery systems according to the invention in a storage facility.

The invention is well-suited for use in warehousing and large scale container storage facilities. As shown in FIG. 11, a single conveyor 76 can service a plurality of container directing apparatus according to the invention. Thus, a series of push plates 72 are located along the path of the conveyor 76 and can direct containers 60 into any necessary container storage position or transfer conveyor.

Figure 12:
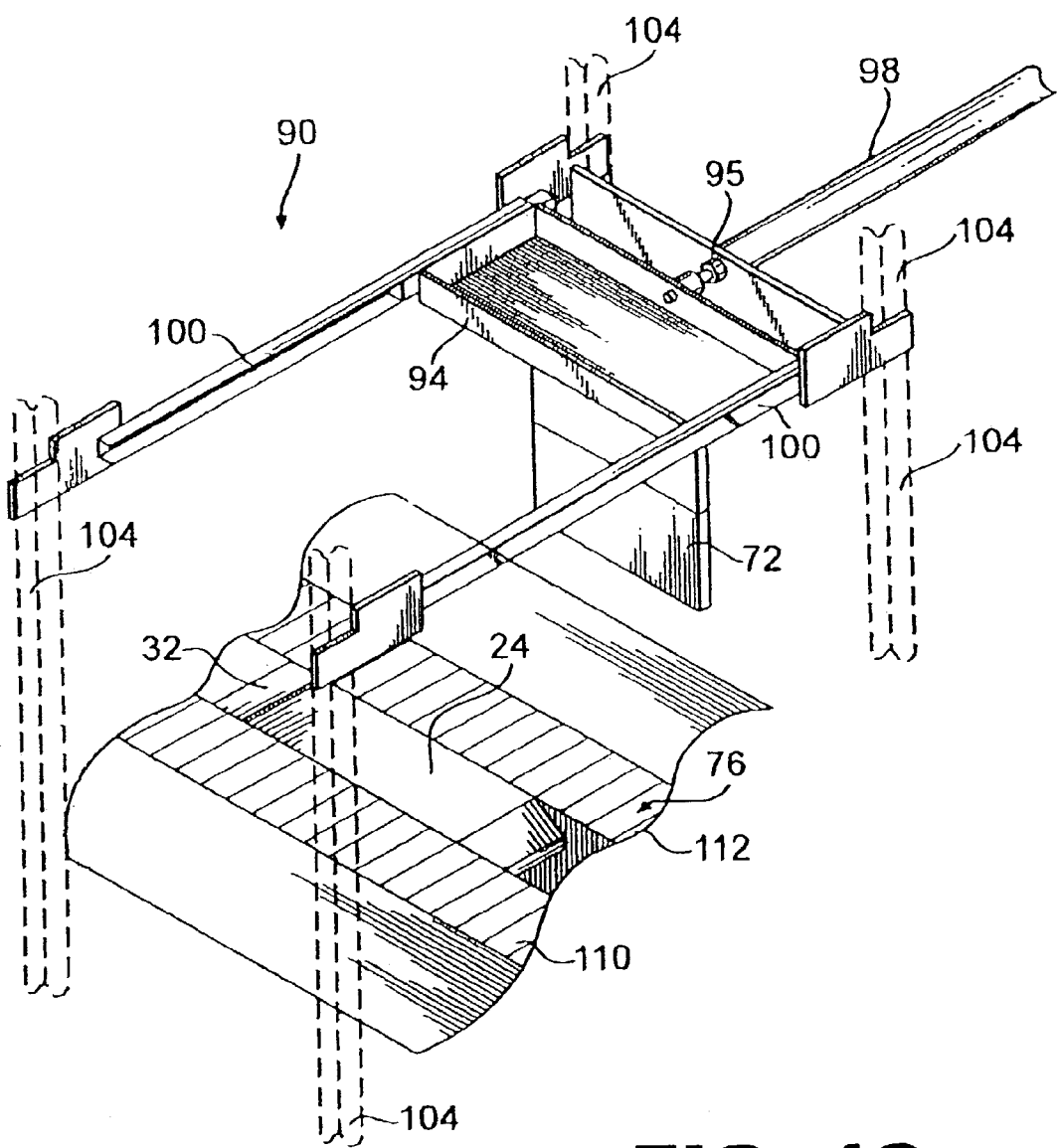
FIG. 12 is a perspective view, partially in phantom, of a moving apparatus according to the invention.
Figure 13A:
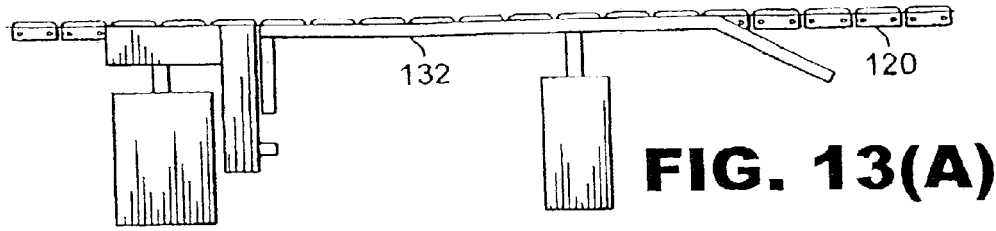
FIGS. 13A–D are side elevations illustrating the sequential operation of a chain conveyor system according to the invention.
Figure 13B:
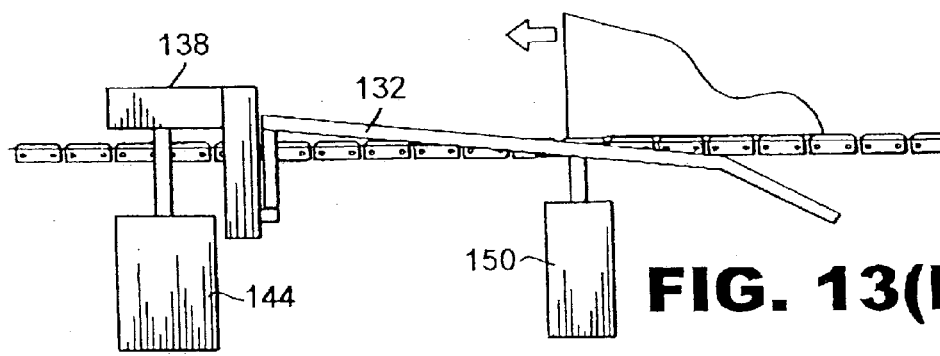
Figure 13C:
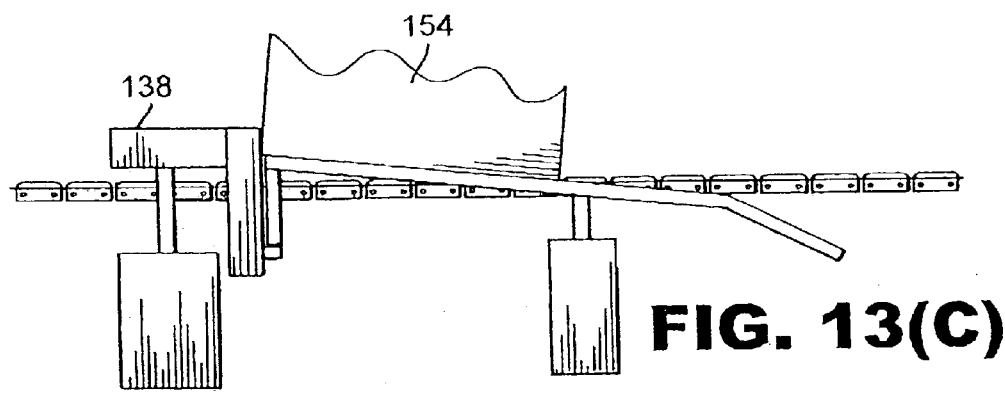
Figure 13D:
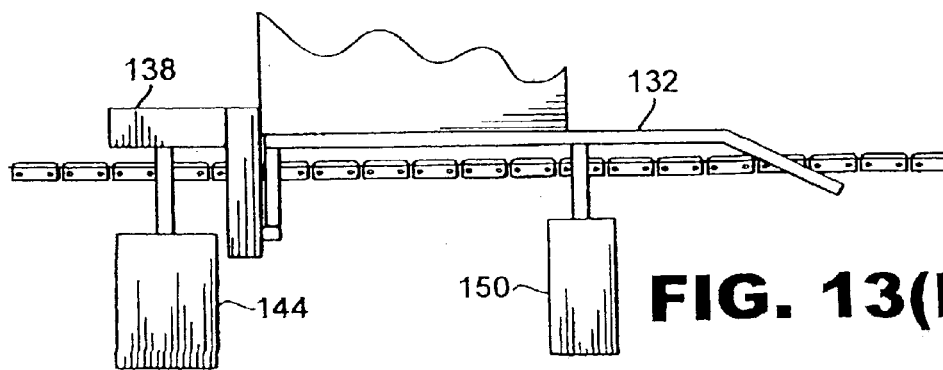

There is shown in FIG. 12 one embodiment of a moving apparatus 90 according to the invention. The pushing apparatus 90 has a push plate 72 or other suitable structure for contacting the container 60 and moving the container off of the lifting surface 28. The push plate 72 can depend from a guide member 94 which is operated by suitable structure such as shaft 96 to move along guide rails 100. The shaft 96 is operated through suitable driving structure such as a solenoid, pneumatic or hydraulic drive, or other suitable structure. The guide rails 100 can be supported by connection to suitable supports 104. The shaft 96 can move through a suitable sleeve 98. Alternative structure for moving the push plate 72 or other moving apparatus can be used.

The container directing apparatus of the invention can be used in conjunction with directing containers 60 to other conveyors for transferring the container to any desired location. In one embodiment, however, the conveyor 76 is flanked by a plurality of storage positions and container directing apparatus according to the invention are utilized to direct the containers in any necessary fashion. The storage stations can be of any suitable design. In one embodiment as shown in FIG. 15, the storage stations are vertically accumulating storage stations, such as those shown by Grace, U.S. Pat. No. 4,621,745, the disclosure of which is incorporated fully by reference. Such an individual container storage and delivery system can be provided adjacent to the conveyor 76. The conveyor 76 is preferably at or above the top of the towers. The push plate 72 directs the container 60 onto conveyor 84, which directs the container 60 to the top of the towers 116. Alternatively, the containers 60 can be pushed directly into the top of the tower. The tower 116 has a frame that defines first and second tower sections, each supporting a number of vertically spaced shelf trays 118 in turn support the containers which are stacked on the trays when loaded. The shelf trays 118 of each tower section face inwardly toward and are staggered relative to each other. Each tray is mounted for pivotal movement about a horizontal axis and is operated so that when a container 60 is dispensed from a chute 119 onto a discharge conveyor 121, each higher tray beginning at the bottom and progressing upward one at a time, pivots to transfer its carton to the upwardly tilted, next lower, empty shelf tray. This process is repeated until each container 60 has been transferred to the next lower shelf tray. As a container 60 is loaded at the top of the tower, the shelf trays are operated to pass the container downwardly in a zig-zag fashion from one tray to another until it reaches the highest unloaded shelf tray.

The system can be part of an integrated, computer-operated container storage and delivery system in which the computer tracks the position of containers throughout the system and on the conveyor 76. The container directing apparatus according to the invention are utilized to direct the container 60 from the conveyor 76 into the appropriate storage position or transfer conveyor.

The conveyor 76 can be of any suitable design. In the embodiments shown, the conveyor is a chain conveyor having tracks 110, 112 that are spaced apart in substantially parallel relation, as is known in the art. The lifting device 24 is positioned between the tracks 110, 112 so as to lift containers off of the tracks, such that the container can be directed by the push plate 72.

There is shown in FIG. 13 an embodiment of the invention in which conveyor 120 is a chain conveyor. The system can include a pair of spaced apart chain conveyor tracks with a container directing apparatus positioned in part between the chain conveyors. The container directing apparatus can include a lifting device with lifting surface 132, stop 138, actuated by suitable structure such as solenoid 144, and with suitable structure such as solenoid 150 to level the lifting surface 132. The action of the container directing apparatus can be as previously described, or can be alternative apparatus. The container lifting device can accordingly be in an initial position wherein containers being conveyed on conveyor 120 are unimpeded, as shown in FIG. 13A. In FIG. 13B, the lifting surface 132 is inclined and the stop 138 is raised. In FIG. 13C, the container 154 has contacted the stop 138. In FIG. 13D, the lifting surface 132 has been leveled by operation of the solenoid 150 and the container can be directed to an appropriate location.

Figure 14:
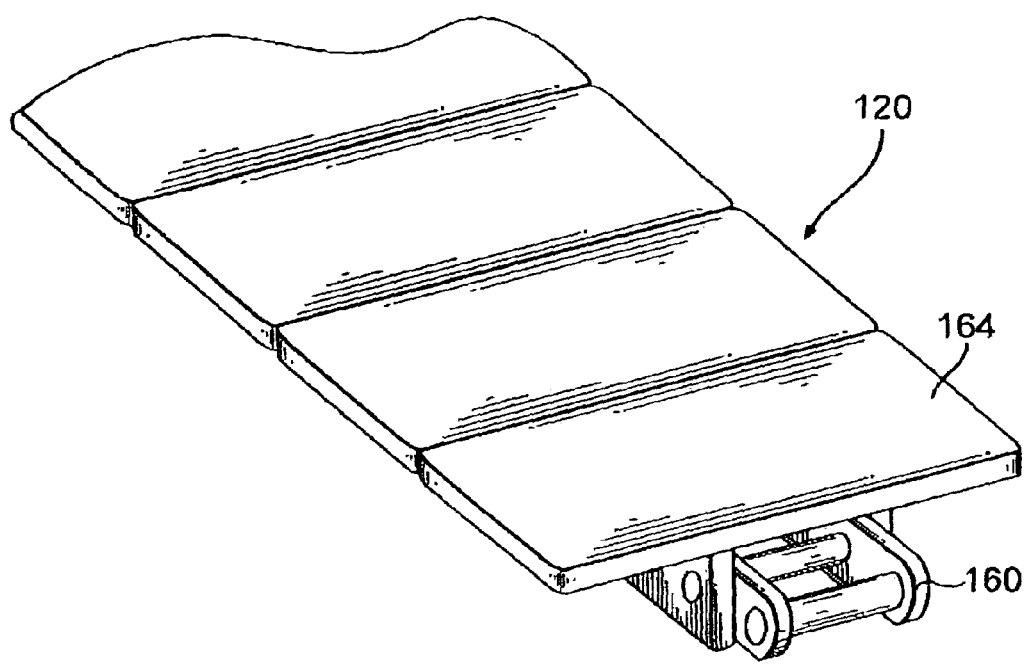
FIG. 14 is a perspective view of a chain conveyor suitable for use with the invention.

In FIG. 14, there is shown a chain conveyor track useful for the invention. It will be appreciated that the conveyor 120 is only one of two substantially parallel tracks which together comprise the conveyor. Containers are rested across the tracks with opposing edges of the container resting on opposing tracks. The chain conveyor comprises a chain 160 which has connected chain links and is moved in conventional fashion to translate the conveyor and containers. Top plates 164 are attached to the chain 160 by suitable means. The top plates 164 provide a substantially smooth and level surface for the containers. The top plates 164 can be made of durable materials such as plastic or metals, or metal coated with plastic, and also can be padded. Various plate and chain configurations for chain conveyors are known in the art. The dimensions of the chain 160 and top plates 164 can vary according to the size and weight of containers which are to be conveyed. In one embodiment, the chain is "and the top plates are approximately 3½" width. Other chain conveyor constructions and dimensions are possible.

This invention can be embodied in other forms without departing from the spirit or essential attributes thereof. Many different mechanical systems can be designed to construct container storage and delivery systems according to the invention and, accordingly, reference should be had to the following claims, rather than to the foregoing specification, as indicating the scope of the invention.

We claim:

1. A container directing apparatus comprising:
   a dual track conveyor;
   a lifting device positioned between parallel tracks of said conveyor, said lifting device comprising an inclinable lifting surface longitudinally extending in the direction of travel of said conveyor and when in an inclined position, having its beginning end in the approximate horizontal plane of the conveyor, and its distant end reaching a horizontal plane higher than said conveyor thereby causing a selected container to incline upward in the direction of travel;
   means to level the entire lifting surface at the height of said distant end to substantially level said selected container; and
   a moving apparatus for moving said selected container off of said lifting surface and said conveyor.

2. The container directing apparatus of claim 1 wherein said moving apparatus is a pushing device.

3. The container directing apparatus of claim 1 wherein said moving apparatus is a pulling device.

4. The container directing apparatus of claim 1, wherein said lifting device comprises a stop for stopping the movement of said containers on said lifting surface.

5. The container directing apparatus of claim 4, wherein said stop is operatively connected to said lifting surface, whereby lifting of said stop will incline said lifting surface.

6. The container directing apparatus of claim 1, wherein said moving apparatus directs containers off of said lifting surface when said lifting surface is substantially level.

7. The container directing apparatus of claim 1, wherein said lifting device comprises at least one solenoid for inclining said lifting surface and for substantially leveling said lifting surface.

8. The container directing apparatus of claim 1, wherein said moving apparatus is capable of directing containers of said lifting surface in at least two directions.

* * * * *